US005835728A

United States Patent [19]

Shinomiya et al.

[11] Patent Number: 5,835,728

[45] Date of Patent: Nov. 10, 1998

[54] SYSTEM FOR ROUTING COMPUTER NETWORK

[75] Inventors: Kazunari Shinomiya, Tokyo; Shingo Takata, Kanagawa, both of Japan

[73] Assignee: NEC Corporation, Tokyo, Japan

[21] Appl. No.: 933,942

[22] Filed: Sep. 19, 1997

Related U.S. Application Data

[63] Continuation of Ser. No. 602,055, Feb. 15, 1996, abandoned.

[30] Foreign Application Priority Data

Feb. 17, 1995 [JP] Japan .................................... 7-029456

[51] Int. Cl.[6] .................................................. G06F 15/177

[52] U.S. Cl. ...................................... 395/200.72; 370/469

[58] Field of Search ......................... 395/200.72, 200.68; 370/469

[56] References Cited

U.S. PATENT DOCUMENTS 5,517,620 5/1996 Hashimoto ......................... 395/200.72
5,526,488 6/1996 Hershey et al. ................... 395/200.72
5,539,881 7/1996 Hunt et al. ......................... 395/200.72
5,588,121 12/1996 Reddin et al. ..................... 395/800.29

OTHER PUBLICATIONS

*International Standard ISO/IEC 10589*, ISO/IEC Copyright Office, Geneva, Switzerland, 1992.

*Primary Examiner*—Parshotam S. Lall
*Assistant Examiner*—Kenneth R. Coulter
*Attorney, Agent, or Firm*—Foley & Lardner

[57] ABSTRACT

A routing system transmits and receives routing information in a computer network having computers of a first kind which support a routing protocol on a connectionless network protocol and computers of a second kind which do not support the routing protocol that is supported by the computers of the first kind, the computers of the first and second kinds being present in the same connectionless network. One of the computers of the first kind establishes a connection in a transport layer to another computer of the first kind through a computer of the second kind. Thereafter, data to be transmitted and received according to the routing protocol to a destination computer through the computer of the second kind are transmitted and receiving using the connection in the transport layer.

5 Claims, 6 Drawing Sheets

1
2
3
11
31
5
5
5
TP4
IS-IS
CLNP
TP4
IS-IS
CLNP
CLNP
Transport No.1

| relaying computer | routing support information | destination information |
|---|---|---|
| 2 | × | 2 |
| 3 | ○ | 2 |
| ⋮ | ⋮ | ⋮ |

| relaying computer | routing support information | destination information |
|---|---|---|
| 2 | × | 2 |
| 3 | ○ | Transport No.1 |
| ⋮ | ⋮ | ⋮ |

| relaying computer | routing support information | destination information |
|---|---|---|
| 2 | × | 2 |
| 1 | ○ | 2 |
| ⋮ | ⋮ | ⋮ |

| relaying computer | routing support information | destination information |
|---|---|---|
| 2 | × | 2 |
| 1 | ○ | Transport No.1 |
| ⋮ | ⋮ | ⋮ |

SYSTEM FOR ROUTING COMPUTER NETWORK

This application is a continuation of application Ser. No. 08/602,055, filed Feb. 15, 1996, now abandoned.

BACKGROUND OF THE INVENTION

1. Field of the Invention

The present invention relates to a system for routing a computer network, and more particularly to a system for routing a computer network having computers of a first kind which supports a routing protocol on a connectionless network protocol and computers of a second kind which do not support the routing protocol that is supported by the computers of the first kind, the computers of the first and second kinds being present in the same connectionless network.

2. Description of the Related Art

There are two types of systems for transmitting data between a plurality of computers in a computer network. One type of such data transmitting system is a connection-type system, and the other a connectionless-type system.

According to the connection-type data transmission system, when data are to be transmitted and received, a logical connection (communication path) is established prior to data transmission, and then data are transmitted through the established connection. The connection-type data transmission system is similar to a system for making telephone connections. A connecting process of the connection-type data transmission system is composed of the following three phases:

1) Establishment of a connection;

2) Transmission and reception of data; and

3) Opening of the connection.

According to the connectionless-type data transmission system, no connection is established, but immediately when data to be transmitted are generated, the data are transmitted to a destination. The connectionless-type data transmission system is similar to a system for making paging connections. Since no connection is established, data indicating a destination is given to each set of data to be transmitted.

The connection-type data transmission system is capable of carrying out reliable communications because connections are established prior to data transmission. However, the connection-type data transmission system takes time in establishing connections. The connectionless-type data transmission system requires shorter connection times, and can send data efficiently.

In either of the connection-type data transmission system and the connectionless-type data transmission system, a route along which to transmit data is determined by routing information according to a routing protocol. Routing information varies from computer to computer, and is determined by routing information sent from another computer which supports the same routing protocol. Routing information of each computer is information indicating a status of connection between computers to which the computer is directly connected and other computers, and is sent to the computers to which the computer is directly connected. A computer which has received routing information then sends the received routing information, together with the information as to the computers to which the computer is directly connected, as routing information to the computers to which the computer is directly connected.

By exchanging routing information between the computers, each of the computers can confirm those computers to which it can transmit data, and can determine a route along which to transmit the data.

A routing protocol is a set of rules for exchanging such routing information. Between computers which do not support the same routing protocol, it is not possible to exchange routing information and transmit and receive data.

FIG. 1 of the accompanying drawings shows in block form a reference model of OSI (Open System Interface) computers interconnected by a network for mutual communications.

As shown in FIG. 1, the reference model is conceptually made up of seven modeled layers. Open systems 400A, 400B for transmitting data have respective application layers 401A, 401B, respective presentation layers 402A, 402B, respective session layers 403A, 403B, respective transport layers 404A, 404B, respective network layers 405A, 405B, respective data link layers 406A, 406B, and respective physical layers 407A, 407B. A relay system 400C for relaying data transmitted between the open systems 400A, 400B is of an arrangement which is actually the same as that of the open systems 400A, 400B. However, the relay system 400C is shown as having only a network layer 405C, a data link layer 406C, and a physical layer 407C.

The details of the seven modeled layers are as follows:

1. Application layer: this is a layer for storing an execution program according to data to be transmitted and received;

2. Presentation layer: this is a layer for controlling data formats, e.g., for effecting conversion between a data format that is processed in the computer and a data format on a transmission line, when data are transmitted and received according to a program stored in the application layer;

3. Session layer: this is a layer for controlling synchronization and transmission priority of data to be transmitted;

4. Transport layer: this is a layer for controlling communications according to a program between computers that communicate with each other;

5. Network layer: this is a layer for controlling communications between computers that communicate with each other;

6. Data link layer: this is a layer for controlling communications between computers adjacent to each other; and 7. Physical layer: this is a physical medium.

FIG. 2 of the accompanying drawings shows the manner in which a program is transferred in the reference model shown in FIG. 1. The open systems 400A, 400B are connected to the relay system 400C through respective physical mediums 501, 502 for transferring a program therebetween.

The OSI computers are capable of transmitting data in either of the connection-type data transmission system and the connectionless-type data transmission system. However, no data can be transmitted between OSI computers which support different routing protocols.

There is known a computer network having computers of a first kind which support a routing protocol on a connectionless network protocol and computers of a second kind which do not support the routing protocol that is supported by the computers of the first kind, the computers of the first and second kinds being present in the same connectionless network. In such a computer network, it has heretofore been impossible to exchange routing information at the computers of the second kind and establish logical connections. The computer network has therefore been functionally completely separated into independent networks composed of the computers of the first and second kinds. The computers of the first kind that are accommodated in the independent networks, respectively, are incapable of transmitting data according to the same routing protocol which they support, though the computers of the first kind are physically connected to each other and support the same routing protocol.

SUMMARY OF THE INVENTION

It is an object of the present invention to provide a system for routing a computer network having computers of a first kind which support a routing protocol on a connectionless network protocol and computers of a second kind which do not support the routing protocol that is supported by the computers of the first kind, the computers of the first and second kinds being present in the same connectionless network, the system allowing the computers of the first kind to transmit and receive routing information and also allowing data to be transmitted between the computers of the first kind according to the same routing protocol.

According to the present invention, there is provided a system for routing a computer network, comprising computers of a first kind which support a routing protocol on a connectionless network protocol, and computers of a second kind which do not support the routing protocol that is supported by the computers of the first kind, the computers of the first and second kinds being present in one connectionless network, each of the computers of the first kind having a routing table for storing routing information including routing support information which indicates whether each destination computer supports the routing protocol or not, and destination information indicating a relaying computer which relays data when the data are transmitted, each of the computers of the first kind comprising means for, when data are to be transmitted therefrom, referring to the destination information stored in the routing table with respect to each destination computer to confirm a relaying computer, referring to the routing support information of the confirmed relaying computer to confirm whether the relaying computer is of the first kind or the second kind, transmitting data according to the routing protocol if the relaying computer is of the first kind, establishing a logic connection passing through one of the computers of the second type if the relaying computer is of the second kind, and transmitting and receiving data using the logic connection when the data are to be subsequently transmitted and received according to the routing protocol through the computer of the second kind.

According to the present invention, there is also provided a system for routing a computer network, comprising computers of a first kind which support a routing protocol on a connectionless network protocol, and computers of a second kind which do not support the routing protocol that is supported by the computers of the first kind, the computers of the first and second kinds being present in one connectionless network, each of the computers of the first kind having a routing table for storing routing information including routing support information which indicates whether each destination computer supports the routing protocol or not, and destination information indicating a relaying computer which relays data when the data are transmitted or a given connection, each of the computers of the first kind comprising means for, when data are to be transmitted therefrom, referring to the destination information stored in the routing table with respect to each destination computer to confirm a relaying computer, referring to the routing support information of a relaying computer to confirm whether the relaying computer is of the first kind or the second kind if the routing table stores information indicating the relaying computer, transmitting data according to the routing protocol if the relaying computer is of the first kind, establishing a logic connection passing through one of the computers of the second type and rewrites the destination information stored in the routing table with respect to the destination computer with information indicating the connection if the relaying computer is of the second kind, and transmitting and receiving data using the connection if the routing table stores information indicating the connection as the destination information which is confirmed when the data are to be transmitted.

The computers of the first kind have the respective routing tables for storing information indicative of physically connected states. If the computers of the first kind confirm a passage of data through a computer of the second kind which does not support the routing protocol, from the information stored in the routing tables, then the computers of the first kind establish a connection capable of transmitting data.

The above and other objects, features, and advantages of the present invention will become apparent from the following description with reference to the accompanying drawings which illustrate an example of the present invention.

BRIEF DESCRIPTION OF THE DRAWING

FIGS. 5(*a*) and 5(*b*) are diagrams showing, by way of example, routing tables in the computers of the first kind shown in FIG. 3.

DETAILED DESCRIPTION OF THE PREFERRED EMBODIMENT

Figure 3:
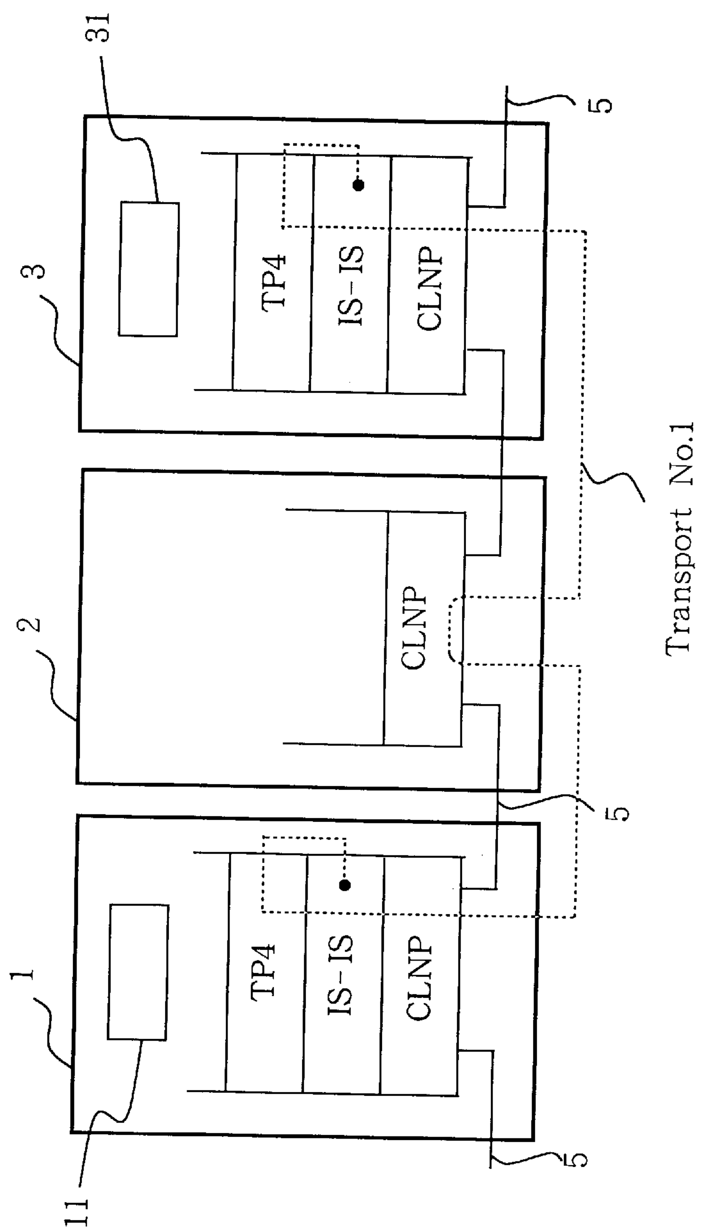
FIG. 3 is a block diagram of a system for routing a computer network according to the present invention.

FIG. 3 shows in block form a system for routing a computer network according to the present invention.

As shown in FIG. 3, the computer network comprises computers 1, 3 of a first kind which supports a routing protocol on a connectionless network protocol and a computer 2 of a second kind which does not support the routing protocol that is supported by the computers 1, 3, the computers 1, 2, 3 being interconnected by cables 5 and present in the same connectionless network.

Figure 4:
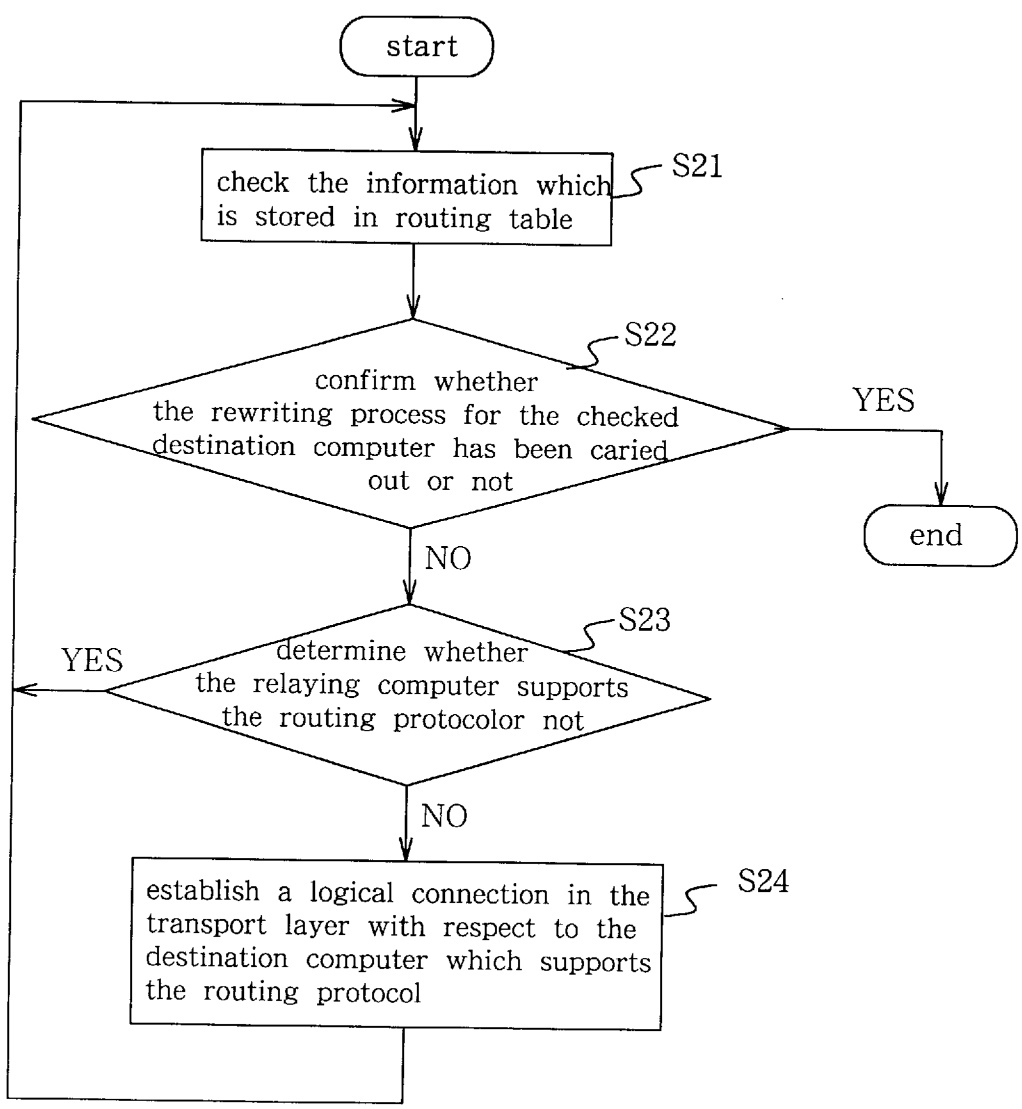
FIG. 4 is a flowchart of a processing sequence which is carried out at the sending time of computers of a first kind shown in FIG. 3.

FIG. 4 shows a processing sequence which is carried out at the sending time of the computers 1, 3 of the first kind shown in FIG. 3.

Figure 1:
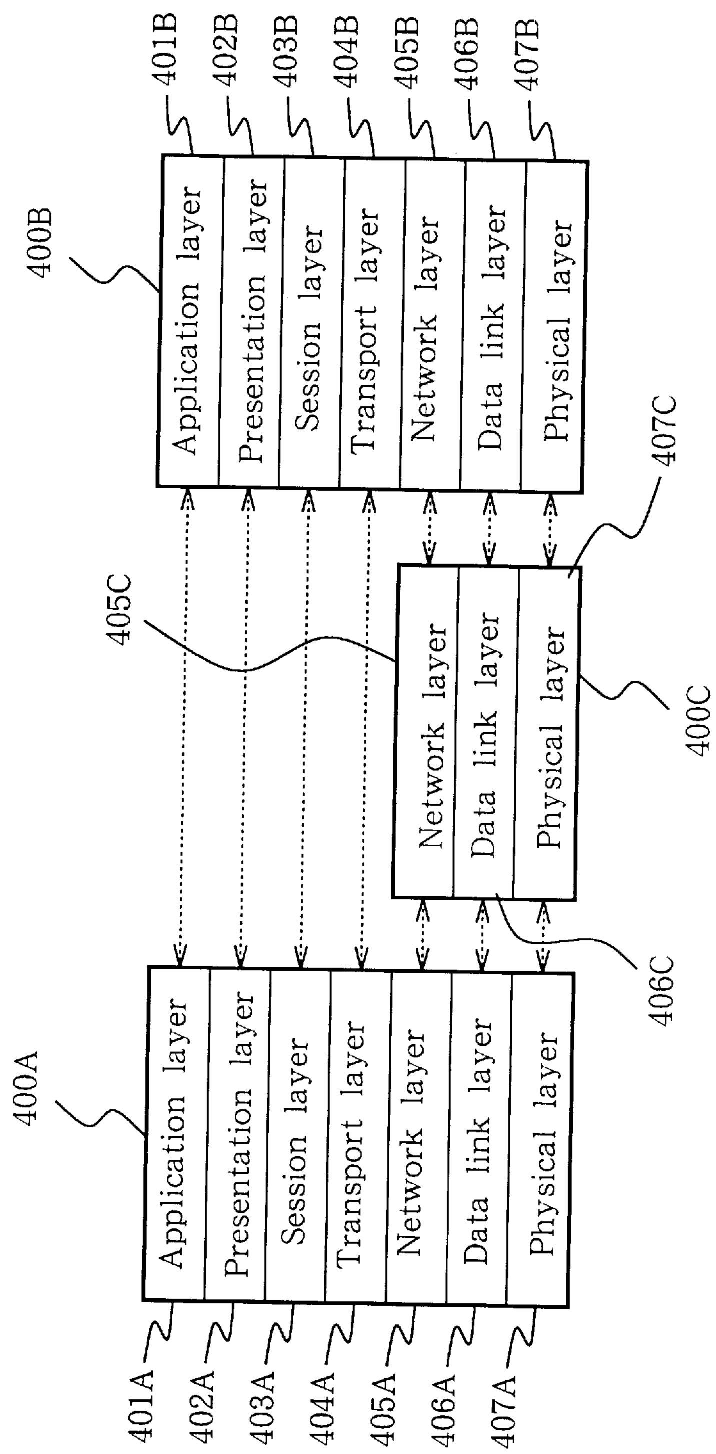
FIG. 1 is a block diagram of a reference model of OSI (Open System Interface) computers interconnected by a network for mutual communications.
Figure 2:
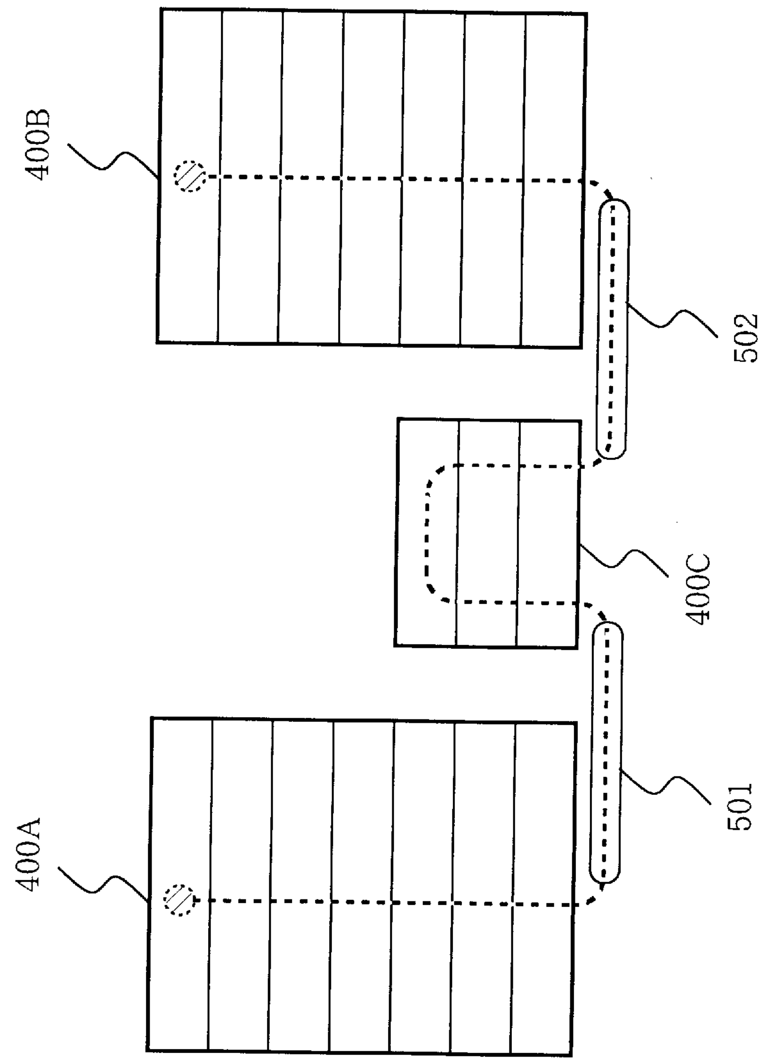
FIG. 2 is a block diagram showing the manner in which a program is transferred in the reference model shown in FIG. 1.

Each of the computers 1–3 shown in FIG. 3 has a plurality of layers including layers TP4, IS—IS, and CLNP. The layer TP4 represents a transport layer connection protocol for setting a logical connection. The layer IS—IS represents a routing protocol. The layer CLNP represents a connectionless network protocol. The transport layer connection protocol (TP4) corresponds to the transport layers 404A, 404B shown in FIG. 1, and the routing protocol (IS—IS) and the connectionless network protocol (CLNP) correspond to the network layers 405A, 405B shown in FIG. 1.

The computers 1, 3 also have respective routing tables 11, 31 for storing routing information. The transport layer connection protocols (TP4) in the computers 1, 3 establish a logical connection by referring to routing information stored in the routing tables 11, 31.

As indicated by the broken line in FIG. 3, a transport No. 1 is established, which is a logical connection in the transport layers (TP4), passing successively through the transport layer connection protocol (TP4) of the computer 1, the connectionless network protocol (CLNP) of the computer 2, and the transport layer connection protocol (TP4) of the computer 3, between the routing protocol (IS—IS) of the computer 1 and the routing protocol (IS—IS) of the computer 3.

Processing operation of the routing system according to the present invention will be described below with reference to FIGS. 3 through 6A, 6B.

Routing information stored in the routing table 11 of the computer 1 will first be described below. Routing information stored in the routing table 11 includes routing support information indicating whether each destination computer, to which data are to be transmitted, supports the routing protocol or not, and destination information indicating a relaying computer which relays data when they are transmitted, or a given connection.

For transmitting data to a destination computer, the computers 1, 3 confirm the destination information stored in the respective routing tables 11, 31 with respect to the destination computer. If the routing tables 11, 31 store information indicating a relaying computer, then the computers 1, 3 refer to routing support information of the relaying computer to confirm whether the relaying computer is of the first kind or the second kind. If the relaying computer is of the first kind, then the computers 1, 3 transmit the date according to the routing protocol. If the relaying computer is of the second kind, then the computers 1, 3 establish a connection passing through the computer of the second kind, and rewrite the destination information stored in the routing tables 11, 31 with information indicating the connection. If the routing tables 11, 31 store information indicating a connection as the destination information that is confirmed when data are to be transmitted, then the computers 1, 3 transmit the data through the connection.

FIGS. 5(*a*), 5(*b*) and 6(*a*), 6(*b*) show tables containing details of information stored in the routing tables 11, 31, respectively. FIGS. 5(*a*) and 6(*a*) illustrate destination information indicating relaying computers which is stored at the time of the start-up for data transmission. FIGS. 5(*b*) and 6(*b*) illustrate destination information which is stored when it is rewritten.

In the tables shown in FIGS. 5(*a*), 5(*b*) and 6(*a*), 6(*b*), a mark "x" represents non-support for the routing protocol on the connectionless network protocol, and a mark "o" represents support for the routing protocol on the connectionless network protocol.

Figure 6:
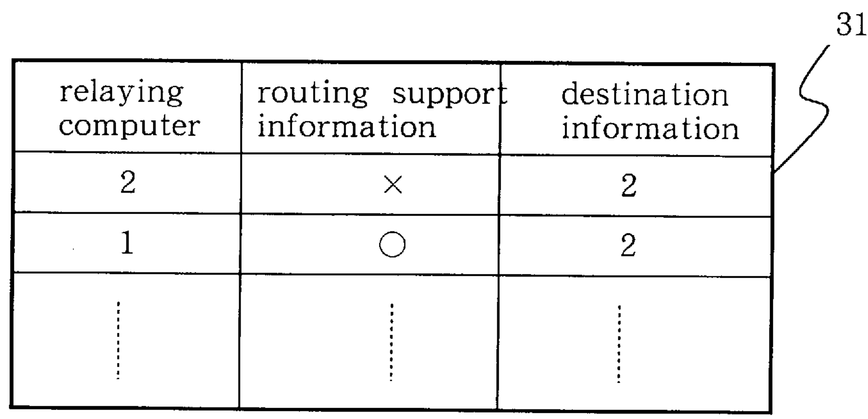
FIGS. 6(*a*) and 6(*b*) are diagrams showing, by way of example, routing tables in the computers of the first kind shown in FIG. 3.
Figure 6:
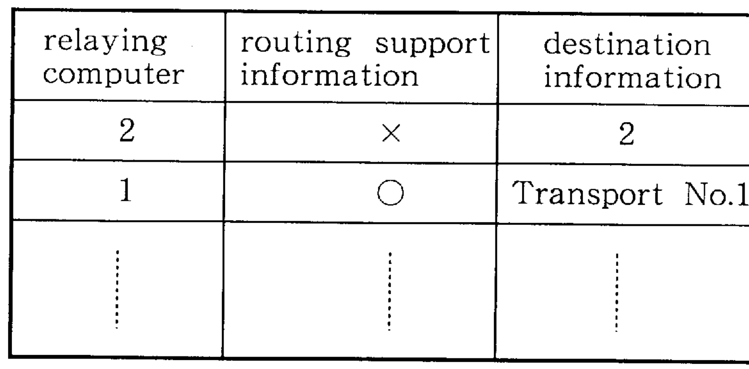

At the time of the start-up for data transmission, the computer 1 confirms, from the information stored in the routing table 11 shown in FIG. 5(*a*), that the destination computer 3 is a computer which supports the routing protocol, and the data are transmitted to the destination computer 3 through the computer 2. Thereafter, the computer 1 establishes the transport No. 1 which is a logical connection in the transport layer (TP4), and rewrites the destination information in the routing table 11 as shown in FIG. 5(*b*). The computer 3 operates in the same manner as the computer 1, and rewrites the destination information in the routing table 31 as shown in FIG. 6(*b*).

The above rewriting process will be described below with reference to FIG. 4.

At the time of transmitting data, the computers 1, 3 of the first kind check the information which is stored in the respective routing tables 11, 31 with respect to the destination computer in a step S21. Thereafter, the computers 1, 3 confirm whether the rewriting process for the checked destination computer has been carried out or not in a step S22. If the rewriting process for the checked destination computer has been carried out, then the rewriting process is brought to an end.

If the computers 1, 3 confirm that the rewriting process for the checked destination computer has not been carried out in the step S22, then control goes to steps S23, S24.

In the step S23, the computers 1, 3 determine whether the relaying computer supports the routing protocol or not. If the computers 1, 3 confirm that the relaying computer does not support the routing protocol in the step S23, then the computers 1, 3 establish a logical connection in the transport layer (TP4) with respect to the destination computer which supports the routing protocol, and then rewrite the routing table 31 in the step S24.

When data are to be subsequently transmitted and received through the computer 2 of the second kind which does not support the routing protocol to the computer 3 of the first kind according to the routing protocol, the data are transmitted and received using the connection in the transport layer.

If it is confirmed that the relaying computer supports the routing protocol in the step S23, then control returns to the step S21.

According to the present invention, as described above, when data are to be transmitted, the computer of the first kind refers to routing information stored in the routing table and establishes a logic connection passing through the computer of the second kind. When data are to be subsequently transmitted and received according to the routing protocol through the computer of the second kind, the data are transmitted and received using the logical connection.

Therefore, even though the computers of the first kind on the connectionless network protocol and the computer of the second kind are present in the same connectionless network, the transmission of data is not interrupted at the computer of the second kind. Consequently, the computers of the first kind can exchange routing information with each other, and can transmit data according to the routing protocol which they support.

Since the above operation is carried out without modifying the software of the computer of the second kind, any cost required to apply the routing system according to the present invention to existing active network systems is relatively low, and the routing system according to the present invention can easily be incorporated in such existing active network systems.

While a preferred embodiment of the present invention has been described using specific terms, such description is for illustrative purposes only, and it is to be understood that changes and variations may be made without departing from the spirit or scope of the following claims.

What is claimed is:

1. A system, comprising:

a plurality of computers including first, second, and third computers, each having a plurality of layers including first, second, and third layers, the first layer representing a transport layer connection protocol for setting a logical connection, the second layer representing a routing protocol, the third layer representing a connectionless network protocol;

wherein each of the computers has respective routing tables for storing routing information, and wherein the transport layer connection protocol establishes a logical connection by referring to routing information stored in the routing tables, and wherein a first transport is established by passing successively through the transport layer connection protocol of the first computer, the connectionless network protocol of the second computer, and the transport layer connection protocol of the third computer, between the routing protocol of the first computer and the routing protocol of the third computer.

2. A system as recited in claim 1, wherein the routing information stored in the routing tables includes routing support information indicating whether each destination computer, to which data are to be transmitted, supports the routing protocol or not, and destination information indicating a relaying computer which relays data when the data are transmitted, or a given connection, wherein for transmitting data to a destination computer, the first and third computers confirm the destination information stored in the respective routing tables with respect to the destination computer, and if the routing tables store information indicating a relaying computer, then the first and third computers refer to routing support information of the relaying computer to confirm whether the relaying computer is of a first kind or a second kind, wherein when the relaying computer is of the first kind, then the first and third computers transmit the data according to the routing protocol, and wherein when the relaying computer is of the second kind, then the first and third computers establish a connection passing through the relaying computer of the second kind, and rewrite the destination information stored in the routing tables with information indicating the connection, and if the routing tables store information indicating a connection as the destination information that is confirmed when data are to be transmitted, then the first and third computers transmit the data through the connection.

3. A system as recited in claim 2, wherein at the time of transmitting data, the first and third computers of the first kind check the information which is stored in the respective routing tables with respect to the destination computer, thereafter, the first and third computers confirm whether the rewriting process for the checked destination computer has been carried out or not, if the rewriting process for the checked destination computer has been carried out, then the rewriting process is brought to an end, and if the first and third computers confirm that the rewriting process for the checked destination computer has not been carried, then the first and third computers determine whether the relaying computer supports the routing protocol or not, if the first and third computers confirm that the relaying computer does not support the routing protocol, then the first and third computers establish a logical connection in the transport layer with respect to the destination computer which supports the routing protocol, and then rewrite the routing table, wherein when the data are to be subsequently transmitted and received through the second computer of the second kind which does not support the routing protocol to the third computer of the first kind according to the routing protocol, the data are transmitted and received using the connection in the transport layer.

4. A system for routing a computer network, comprising:

computers of a first kind which support a routing protocol on a connectionless network protocol; and computers of a second kind which do not support the routing protocol that is supported by the computers of the first kind, said computers of the first and second kinds being present in one connectionless network;

each of said computers of the first kind having a routing table for storing routing information including routing support information which indicates whether each destination computer supports said routing protocol or not, and destination information indicating a relaying computer which relays data when the data are transmitted;

each of said computers of the first kind comprising means for, when data are to be transmitted therefrom, referring to the destination information stored in said routing table with respect to each destination computer to confirm a relaying computer, referring to the routing support information of the confirmed relaying computer to confirm whether the relaying computer is of the first kind or the second kind, transmitting data according to the routing protocol if the relaying computer is of the first kind, establishing a logic connection passing through one of the computers of the second type if the relaying computer is of the second kind, and transmitting and receiving data using said logic connection when the data are to be subsequently transmitted and received according to the routing protocol through the computer of the second kind.

5. A system for routing a computer network, comprising:

computers of a first kind which support a routing protocol on a connectionless network protocol; and computers of a second kind which do not support the routing protocol that is supported by the computers of the first kind, said computers of the first and second kinds being present in one connectionless network;

each of said computers of the first kind having a routing table for storing routing information including routing support information which indicates whether each destination computer supports said routing protocol or not, and destination information indicating a relaying computer which relays data when the data are transmitted or a given connection;

each of said computers of the first kind comprising means for, when data are to be transmitted therefrom, referring to the destination information stored in said routing table with respect to each destination computer to confirm a relaying computer, referring to the routing support information of a relaying computer to confirm whether the relaying computer is of the first kind or the second kind if the routing table stores information indicating the relaying computer, transmitting data according to the routing protocol if the relaying computer is of the first kind, establishing a logic connection passing through one of the computers of the second type and rewrites the destination information stored in said routing table with respect to the destination computer with information indicating said connection if the relaying computer is of the second kind, and transmitting and receiving data using the connection if the routing table stores information indicating the connection as the destination information which is confirmed when the data are to be transmitted.

* * * * *